United States Patent
Bloms et al.

(10) Patent No.: US 9,371,754 B2
(45) Date of Patent: Jun. 21, 2016

(54) DIESEL PARTICULATE FILTER REGENERATION CONTROL AND METHOD

(75) Inventors: Jason K. Bloms, Edwards, IL (US); David Kapparos, Chillicothe, IL (US); Tyler V. Richards, Peoria, IL (US); Glenn B. Cox, Peoria, IL (US); Matt Leustek, Metamora, IL (US); Rajiv Nanjundareddy, Peoria, IL (US); Vadiraj P. Kulkarni, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 1998 days.

(21) Appl. No.: 12/403,178

(22) Filed: Mar. 12, 2009

(65) Prior Publication Data
US 2010/0229538 A1    Sep. 16, 2010

(51) Int. Cl.
| | |
|---|---|
| *F01N 3/00* | (2006.01) |
| *F01N 3/10* | (2006.01) |
| *F01N 3/02* | (2006.01) |
| *F01N 3/025* | (2006.01) |
| *F01N 9/00* | (2006.01) |

(52) U.S. Cl.
CPC ............. *F01N 3/0256* (2013.01); *F01N 3/106* (2013.01); *F01N 9/002* (2013.01); *F01N 2560/08* (2013.01); *F01N 2560/14* (2013.01); *F01N 2900/08* (2013.01); *F01N 2900/12* (2013.01); *Y02T 10/47* (2013.01)

(58) Field of Classification Search
CPC ............ F01N 2560/08; F01N 2560/14; F01N 2900/08; F01N 2900/12; F01N 3/0256; F01N 3/106; F01N 9/002; Y02T 10/47
USPC ............................ 60/274, 295, 297, 311, 303
See application file for complete search history.

(56) References Cited

U.S. PATENT DOCUMENTS

| | | | | |
|---|---|---|---|---|
| 4,531,363 | A  * | 7/1985 | Ludecke et al. | 60/303 |
| 4,887,426 | A | 12/1989 | Goerlich | |
| 5,319,930 | A  * | 6/1994 | Shinzawa et al. | 60/286 |
| 6,622,480 | B2 | 9/2003 | Tashiro et al. | |
| 6,948,311 | B2 * | 9/2005 | Schaller et al. | 60/286 |
| 6,952,918 | B2 * | 10/2005 | Imai et al. | 60/295 |
| 6,966,179 | B2 | 11/2005 | Onodera et al. | |
| 6,978,607 | B2 | 12/2005 | Matsumoto et al. | |
| 7,028,466 | B2 | 4/2006 | Kondou et al. | |
| 7,029,510 | B2 | 4/2006 | Fränkle et al. | |
| 7,082,754 | B2 | 8/2006 | Otake et al. | |
| 7,147,688 | B2 | 12/2006 | Kondou et al. | |
| 7,181,909 | B2 | 2/2007 | Sato et al. | |

(Continued)

FOREIGN PATENT DOCUMENTS

| | | |
|---|---|---|
| EP | 1316692 | 6/2003 |
| EP | 1321642 | 6/2003 |

(Continued)

*Primary Examiner* — Jesse Bogue
*Assistant Examiner* — Diem Tran
(74) *Attorney, Agent, or Firm* — Leydig, Voit & Mayer, Ltd.

(57) ABSTRACT

An after-treatment device that includes a diesel particulate filter (DPF) requiring periodic regeneration includes a sensor providing a signal indicative of a soot accumulation and at least one device providing an operating parameter indicative of a work mode of the machine. A controller determines a soot level and a readiness level based on the work mode of the machine, and further classifies the soot level relative to a desired range for initiating a regeneration event and initiates the regeneration event when the soot level falls within the desired range.

21 Claims, 7 Drawing Sheets

(56) References Cited

U.S. PATENT DOCUMENTS

| | | |
|---|---|---|
| 7,200,991 B2 | 4/2007 | Otake et al. |
| 7,208,029 B2 | 4/2007 | Shirakawa et al. |
| 7,219,493 B2 | 5/2007 | Tsutsumoto et al. |
| 7,237,379 B2 | 7/2007 | Nakano et al. |
| 7,395,661 B2 | 7/2008 | Iida |
| 7,396,389 B2 | 7/2008 | Kariya et al. |
| 7,406,822 B2 | 8/2008 | Funke et al. |
| 7,937,935 B2 * | 5/2011 | Williams et al. ......... 60/295 |
| 2006/0287795 A1 | 12/2006 | Samad et al. |
| 2007/0234712 A1 | 10/2007 | Ohmura |
| 2007/0245714 A1 | 10/2007 | Frazier et al. |
| 2008/0209895 A1 | 9/2008 | Miller et al. |

FOREIGN PATENT DOCUMENTS

| | | |
|---|---|---|
| EP | 1914138 | 4/2008 |
| WO | 2007055160 | 5/2007 |
| WO | 2009041165 | 4/2009 |

\* cited by examiner

DIESEL PARTICULATE FILTER REGENERATION CONTROL AND METHOD

TECHNICAL FIELD

The present disclosure relates to a particulate trap regeneration system and, more particularly, to a particulate trap regeneration system and an associated control strategy.

BACKGROUND

One of the byproducts of fuel combustion in an internal combustion engine is carbon particles, which are typically referred to as soot. Emission standards will typically specify a limit to the amount of soot that an engine can emit to the environment, which limit will be below the level of soot generated by the engine during operation. Therefore, various components and systems are employed by engine or vehicle manufacturers that control and limit the amount of soot emitted to the environment.

One device commonly used to limit the amount of soot expelled into the environment from an engine is referred to as a particulate trap. Such a device includes a porous substrate, for example, made of ceramic material, that may be coated with various chemical compounds that alter the composition of exhaust constituents. The porosity of the substrate acts as a filter for physically trapping carbon particles or soot in an exhaust stream passing over and/or through the filter. One can appreciate that such physical removal of carbon particles from a gas stream will progressively saturate the filter with particulate matter.

One method of restoring the performance of a particulate trap becoming saturated with soot is by a process called regeneration. Regeneration involves the oxidation or burning of accumulated particulate matter in a filter. Such oxidation may include the introduction of a combustible agent, such as fuel, onto the particulate matter to aid in the combustion. Moreover, regeneration of particulate traps often includes an elevation of the temperature of the particulate matter, for example, by elevating the temperature of the exhaust gas stream passing therethrough, prior to combustion.

Commonly used methods of regenerating a particulate filter involve an active intervention to the normal operation of the engine. Such intervention may be perceptible to an operator of the engine, and may even interfere with the normal operation of the vehicle. In other words, processes that alter the fueling strategy of an engine to introduce fuel in the exhaust stream or, more commonly, operation of the engine to increase exhaust temperature, can alter the behavior and power output of a vehicle or machine. Such alterations may interfere with normal use of equipment, which can have repercussions in the uptime and cost of operating the equipment.

The time and duration of a regeneration event depends on many factors, such as the extent of accumulation of soot or carbon particulate matter on the filter, the operating conditions of the engine, and so forth. One example of a particulate trap system and control method therefor can be seen in U.S. Pat. No. 7,406,822 (hereafter, the '822 patent), which issued to Funke et al. and is assigned Caterpillar Inc. of Peoria, Ill. The '822 patent describes a system that includes a particulate trap and a regeneration device configured to reduce an amount of particulate matter in the particulate trap.

The system described in the '822 patent further includes a controller that activates the regeneration device in response to the first to occur of at least three trigger conditions. The trigger conditions may include, for example, operation of the engine for a predetermined period, consumption of a predetermined amount of fuel by the engine, detection of an elevated backpressure upstream of the particulate trap, detection of a pressure differential across the particulate trap that exceeds a threshold, or a calculated amount of particulate matter accumulated on the particulate trap that exceeds a limit. Such parameters may be independently evaluated to determine that a regeneration event is required. Thereafter, the controller may activate the regeneration device to oxidize the particulate matter found at the particulate trap.

Even though activation of a regeneration event for a particulate trap, whether such event involves use of a regeneration device or not, can be effective in removing trapped particulate matter when such concentration on a trap has exceeded a limit. Such regeneration may occur at any time during operation of the engine and may reduce, even temporarily, the effectiveness of any machine or vehicle, which heretofore has been an undesirable but necessary process. For example, a particulate trap installed on an on-highway truck may require the truck to be stopped on the side of the road while a regeneration event is taking place. It is desired to reduce or eliminate such intrusions to the normal operation of a vehicle or machine whenever possible.

SUMMARY

The disclosure describes, in one aspect, a machine having an after-treatment device that includes a diesel particulate filter (DPF) requiring periodic regeneration. The DPF receives a flow of exhaust gas provided by an engine associated with the machine. The machine further includes a sensor providing a signal indicative of a soot accumulation in the DPF, and at least one device providing an operating parameter indicative of a work mode of the machine. The sensor may directly measure soot and/or may generate a signal indicative of soot from indirect sources. A controller associated with the machine may receive the signal from the sensor and the operating parameter from the at least one device. The controller is arranged to determine a soot level based on the soot accumulation in the DPF, wherein the determination of soot accumulation is least partially based on the signal, and a readiness level based on the work mode of the machine, the work mode being at least partially based on the operating parameter. The controller may classify the soot level relative to a desired readiness level for initiating a regeneration event and initiate the regeneration event when the readiness level coincides with the desired readiness level or other suitable threshold.

In another aspect, the disclosure describes a method for initiating a regeneration event for a DPF. The method includes providing a signal indicative of a soot accumulation in the DPF and an operating parameter indicative of a work mode of the machine. A soot level may be determined based on the soot accumulation in the DPF, which may be at least partially based on the signal, and a readiness level may be determined based on the work mode of the machine, which is at least partially based on the operating parameter. Thereafter, the method includes classifying the soot level relative to a desired readiness level for initiating a regeneration event and initiating the regeneration event when the readiness level coincides with the desired readiness level.

In yet another aspect, the disclosure describes an after-treatment system associated with an engine of a machine. The after-treatment system includes an after-treatment device fluidly communicating with an exhaust conduit connected to the engine. A regeneration device is included between the engine and the after-treatment device along the exhaust conduit and has a first sensor providing a soot signal indicative of a soot accumulation within the after-treatment device. A second sensor associated with the machine provides a work signal indicative of a work mode of the machine. The second sensor, like the first sensor, generates a signal based on either direct or indirect measurements. A controller associated with the engine, the regeneration device, the first sensor, and the second sensor, determines a soot level of accumulation within the after-treatment device based on the soot signal and a readiness level of regeneration for the after-treatment device based on the work mode of the machine. Such work mode may be at least partially based on the work signal. The soot level is classified relative to a desired readiness level for initiating a regeneration event and the regeneration device initiates a regeneration event in the after-treatment device when the readiness level of regeneration reaches the desired readiness level or other suitable threshold.

DETAILED DESCRIPTION

Figure 1:
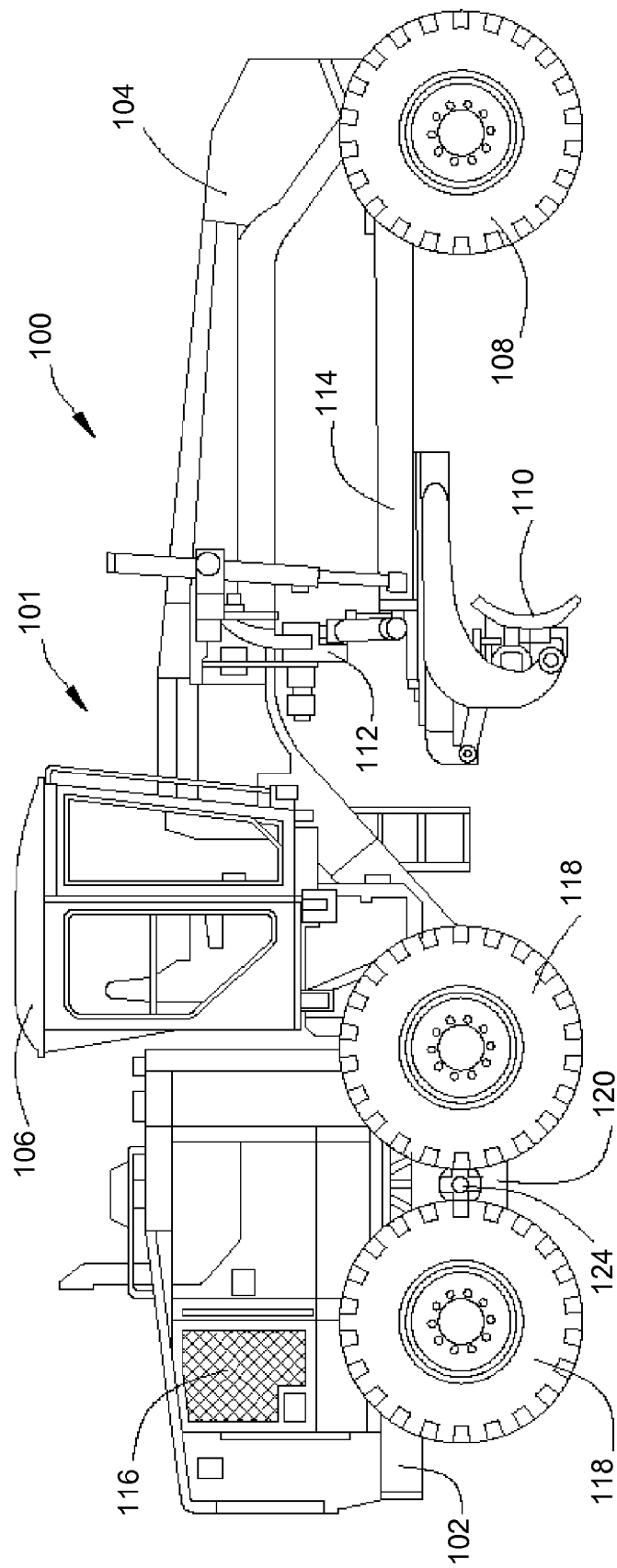
FIG. 1 is an outline view from the side of a machine in accordance with the disclosure.

A side view of a machine 100, in this example a motor grader 101, is shown in FIG. 1. The term "machine" is used generically to describe any machine having at least one drive wheel that is directly driven by a motor connected to the wheel, for example, by use of electrical or hydrostatic power, by a gear system or transmission interconnecting the wheel with an engine, or any other known drive arrangement. For instance, an alternative embodiment for the machine 100 may include a generator or another device capable of producing an alternative form of energy, such as electrical power.

The motor grader 101 shown in FIG. 1 generally includes a two-piece frame made up of an engine frame 102 and an implement portion 104. Alternatively, the motor grader 101 may include a single frame piece. The engine frame 102 in the embodiment shown is connected to the implement portion 104 by a pivot (not shown). The implement portion 104 includes an operator cab 106 and two idle wheels 108 (only one visible) that contact the ground. A shovel or blade 110 is suspended along a mid-portion of the implement portion 104. The blade 110 can be selectively adjusted to engage the ground at various heights and angles to achieve a desired grade or contour while the motor grader 101 operates. Adjustment of the position of the blade 110 is accomplished by a system of actuators, generally denoted in FIG. 1 as 112, while support for the loading experienced by the blade 110 during operation is accomplished by a bar 114, which pivotally connects the implement portion 104 to the blade 110.

The engine frame 102 supports an engine (not visible), which is protected from the elements by an engine cover 116. The engine provides the power necessary to propel the motor grader 101 as well as to operate the various actuators and systems of the motor grader 101. As can be appreciated, other machines may have different configurations and/or various other implements associated therewith. The term "machine" as used herein may refer to any machine that performs some type of operation associated with an industry such as mining, construction, farming, transportation, or any other industry known in the art. For example, a machine may be an earth-moving machine, such as a wheel loader, excavator, dump truck, backhoe, motor grader, material handler or the like. Similarly, although an exemplary blade 110 is illustrated as the attached implement, an alternate implement may be included. Any implements may be utilized and employed for a variety of tasks, including, for example, loading, compacting, lifting, brushing, and include, for example, buckets, compactors, forked lifting devices, brushes, grapples, cutters, shears, blades, breakers/hammers, augers, and others.

In the illustrated machine, the engine in the engine frame 102 may be associated with a hydrostatic pump (not shown), which may be part of a hydraulic system operating a propel system of the motor grader 101. In the embodiment shown, the motor grader 101 is driven by two sets of drive wheels 118 (only one set visible), with each set including two wheels 118 that are arranged in a tandem configuration along a beam 120, which is connected to the frame 102 at a pivot joint or bearing 122.

Figure 2:
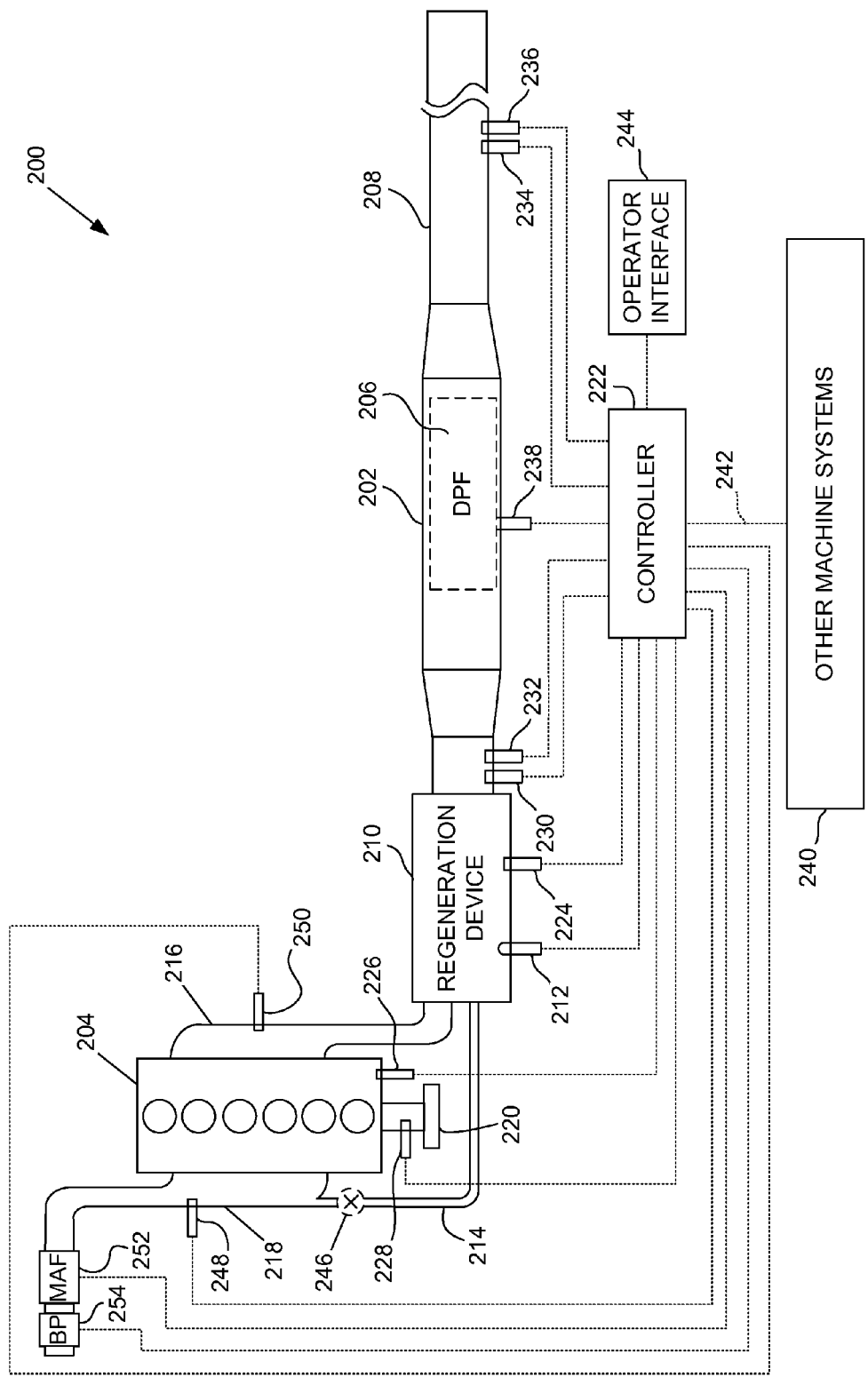
FIG. 2 is a block diagram of an engine having an after-treatment system associated therewith in accordance with the disclosure.

A block diagram of an after-treatment system 200 that may be associated with the machine 100 is shown in FIG. 2. The after-treatment system 200 includes an after-treatment device 202 disposed to receive a flow of exhaust gas from an engine 204. The after-treatment device 202 may include one or more internal devices operating to chemically, or physically treat a flow of exhaust gas passing therethrough. Examples of such devices include oxidation catalysts, particulate filters, adsorbing filters, and others. Relevant to the present disclosure, the after-treatment device 202 essentially includes a diesel particulate filter (DPF) 206, which is shown in dashed line and which may be included as part of the after-treatment device 202 or may be disposed as a stand-alone part in fluid communication with an exhaust pipe or conduit of an engine.

The illustration of FIG. 2 will now be described in more detail. Such illustration is exemplary and represents one potential embodiment of an after-treatment system associated with an engine that is installed in a vehicle or machine. The after-treatment system 200 includes an exhaust conduit or pipe 208 that is fluidly connected to the after-treatment device 202 and DPF 206. Exhaust gas passing through the after-treatment device 202 and the DPF 206 flows through the exhaust pipe 208.

In the embodiment shown in FIG. 2, the after-treatment device 202 is fluidly connected to a regeneration device 210. The regeneration device 210 may be any device operating to initiate, maintain, and/or control the rate of a regeneration event occurring in the DPF 206 during operation of the engine 204. One example of a regeneration device is described in the '822 patent discussed above. An additional example for a regeneration device is illustrated to include a burner (not shown) disposed to selectively yield a flame that can be used to initiate, maintain, and/or control regeneration of particulate matter that has accumulated on the DPF 206. The illustrated regeneration device 210 includes an injector 212 disposed to inject a fuel, such as diesel, or a catalyst. When fuel is injected, a flow of fresh, compressed air is supplied via a conduit 214 to mix with the fuel and, in the presence of a spark, create the flame that introduces heat to the flow of exhaust gas and/or the DPF 206. Such heat helps oxidize carbon and other deposits found on the DPF 206 during a regeneration event, which may produce byproducts, such as ash, that can be collected and/or removed from the DPF 206 during service.

In the illustrated embodiment, the after-treatment device 202 is fluidly connected to an exhaust manifold 216 of the engine 204. The engine 204 operates to combine fuel and air supplied to a plurality of cylinders via an intake manifold 218 to produce power or torque at an output shaft 220. In a known configuration, each of the cylinders of the engine 204 includes a piston connected to a rotating crankshaft (not shown) via linkages (not shown). The reciprocating motion of the pistons generates a rotational motion of the crankshaft. Such rotational motion may be transferred to various components and systems of a machine, such as hydrostatic pumps, mechanical and/or hydraulic transmissions, electrical generators, work implements, and so forth. In the illustration of FIG. 2, the output shaft 220 generically represents a mechanical linkage that can transfer torque and power generated by the engine 204 during operation to any such components and systems of the machine.

The after-treatment system 200 may further include a controller 222. The controller 222 may be a single controller or may include more than one controller disposed to control various functions and/or features of a machine. For example, a master controller, used to control the overall operation and function of the machine, may be cooperatively implemented with a motor or engine controller, used to control the engine 204. The term "controller" broadly encompasses one, two, or more controllers that may be associated with the machine 100 and that may cooperate in controlling various functions and operations of the machine 100 (FIG. 1) including control of a regeneration device or regeneration processes. The functionality of the controller, while shown conceptually in the figures that follow to include various discrete functions for illustrative purposes only, may be implemented in hardware and/or software without regard to the discrete functionality shown. Accordingly, various interfaces of the controller are described relative to components of the after-treatment system 200 shown in the block diagram of FIG. 2. Such interfaces are not intended to limit the type and number of components that are connected, nor the number of controllers that are described. The interconnections between the controller 222 and the various sensors and actuators are denoted in dashed line, which represent communication lines for transferring information signals and commands to and from the controller 222. As can be appreciated, any appropriate type of connection may be used, for example, electrical conductors carrying analog or digital electrical signals, and/or electronic communication channels such as those found in confined area network (CAN) arrangements.

The controller 222 is connected to various sensors and actuators that are disposed to measure various parameters during operation of the after-treatment system 200. The controller 222 is thus disposed to receive information indicative of such operational parameters, to process such information, and to use such information to operate the after-treatment system 200 effectively and efficiently. As illustrated in the embodiment of FIG. 2, the controller 222 may be connected to the injector 212 and to a flame or temperature sensor 224 associated with the optional regeneration device 210. The controller 222 further maybe further connected to an engine speed sensor 226 and to an optional load sensor 228 disposed to measure a load being present at the output shaft 220.

The controller 222 also may communicate with an upstream temperature sensor 230 and an upstream pressure sensor 232. The upstream sensors 230 and 232 are disposed to provide signals to the controller 222 that are indicative of, respectively, the temperature and pressure of the exhaust gas flow before such flow enters or passes through the after-treatment device 202 and, in this case, before it passes through the DPF 206. The controller 222 may further communicate with a downstream temperature sensor 234 and a downstream pressure sensor 236. The downstream sensors 234 and 236 provide signals to the controller 222 that are indicative of, respectively, the temperature and pressure of the exhaust flow exiting the DPF 206. Even though separate sensors are shown disposed upstream and downstream of the DPF 206, for example, the upstream pressure sensor 232 and the downstream pressure sensor 234, one can appreciate that a single sensor may be used instead, for example, a differential pressure sensor disposed to measure a difference in pressure between upstream and downstream locations relative to the direction of flow of exhaust gas through the after-treatment device 202.

In one embodiment, the DPF 206 includes a soot sensor 238. The soot sensor 238, if present, operates to provide a signal that is indicative of the amount of material that has accumulated in the DPF 206. In one embodiment, the soot sensor 238 emits radio frequency signals that pass through a filter element of the DPF 206 before being reflected back to the soot sensor 238 where they are received. The soot sensor 238 can provide a signal that is indicative of changes in amplitude between radio signals sent to the DPF 206 and radio signals received back from the DPF 206. In one embodiment, such changes in amplitude are correlated to an extent of soot loading of the DPF 206, such that an estimation of the amount of material having collected within the DPF 206 can be determined by, for example, logic integrated in the soot sensor 238 or logic present within the controller 222.

In the embodiment of FIG. 2, the controller 222 is further connected to other machine systems 240, which are represented collectively as a single block in FIG. 2. Communication of information and command signals between the controller 222 and the other machine systems can be accomplished by any appropriate method. In one embodiment, a multi-channel CAN link 242 provides appropriate channels of communication between the controller 222 and each of the other machine systems 240. Such other machine systems can include any component or system of the machine that provides functional information during operation of the machine. Examples of such systems include a neutral switch, which provides information about a transmission or traction system of the machine, a parking brake switch, which provides information about the engagement state of a parking and/or emergency brake, a throttle setting switch, which provides information indicative of the extent of throttle engagement of the engine 204, an implement lockout engagement switch, an operator presence switch, and others. One can appreciate that different systems, and thus different information about such systems, may be available depending on the type of machine or vehicle involved.

An operator interface 244 is communicatively connected to the controller 222 and arranged to provide visual and/or audio information signals to an operator of the machine. Of course, such interface is optional and may include one or more operator controls, such as a manual enable or disable switch. The operator interface 244 may include a display for displaying information relative to the operational status of the aftertreatment system 200. The operator interface 244 may be a standalone or dedicated interface for displaying information and receiving commands relative to the after-treatment system 200 alone, for example, when such system is retrofitted to an existing machine, or may be integrated with a multi-functional or multi-purpose display that is arranged to interface with other systems of the machine.

Figure 3:
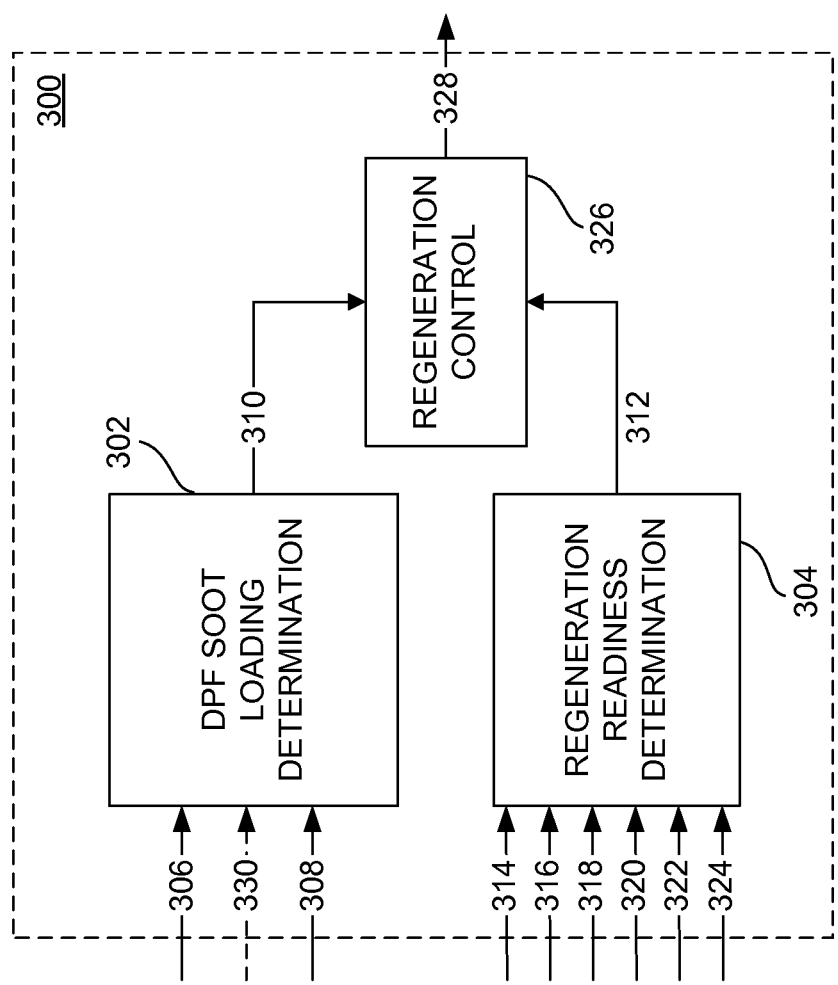
FIG. 3 is a block diagram of an after-treatment control in accordance with the disclosure.

A block diagram of an after-treatment control 300 is shown in FIG. 3. The functions may be implemented partially or entirely within controller 222. The after-treatment control 300 is arranged to, essentially, perform two functions; a first function is to determine the soot loading of a DPF, which is illustrated as a DPF soot loading determinator 302, and the second is to determine a readiness state for performing a regeneration of the DPF, which is illustrated as a regeneration readiness determinator 304. During operation, the soot load is considered when deciding whether a regeneration event should be initiated based on the determination of the regeneration readiness of the system. In one embodiment, the after-treatment control 300 is arranged to initiate regeneration more aggressively when the soot loading of the DPF is increased. The operation of one embodiment of the after-treatment control 300 will now be described in more detail.

In the embodiment illustrated in FIG. 3, the DPF soot loading determinator 302 operates to quantify, for example, as a percentage of full loading, the loading state of a DPF that is associated with an after-treatment system installed on a machine, such as the DPF 206 installed as part of the after-treatment system 200 of the machine 100 shown in FIG. 1 and FIG. 2. The DPF soot loading determinator 302 makes such determination based on a soot signal 306 and a pressure signal 308. The soot signal 306 may be provided by an appropriate sensor that is associated with the DPF, such as the soot sensor 238 (FIG. 2), and the pressure signal 308 may be provided from a pressure sensor measuring exhaust gas pressure either upstream, downstream, or a pressure difference across the DPF. In one embodiment, such pressure sensor may be the upstream pressure sensor 232 (FIG. 2). In an alternate embodiment, the pressure sensor may be the downstream pressure sensor 234, a differential pressure sensor measuring a pressure difference across the DPF 206 (FIG. 2), or both the upstream and downstream pressure sensors 232 and 234, in which case a signal processing device may calculate the difference in value between the two sensors to yield the pressure signal 308.

The DPF soot loading determinator 302 provides a soot loading determination signal 310 as an output thereof. The soot loading determination signal 310 may be expressed in any suitable quantification parameter. In the illustrated embodiment, the soot loading determination signal 310 is expressed as a "Soot Level," which is a positive value ranging from 0 to 5 and which depends on the percentage of soot loading having been determined for the DPF according to Table 1, shown below:

TABLE 1

| DPF Soot Loading (%) | | | | | | |
|---|---|---|---|---|---|---|
| 0 | 50 | 80 | 100 | 110 | 120 | 140 |
| Soot Level 0 | 1 | 2 | 3 | 3.5 | 4 | 5 |

As can be appreciated, the extent of soot loading in the particulate filter can be expressed as a percentage of the total capacity of soot that can be filtered by a filter element of a given size, with percentage values that exceed 100% indicating that the filter has been overloaded.

Figure 4:
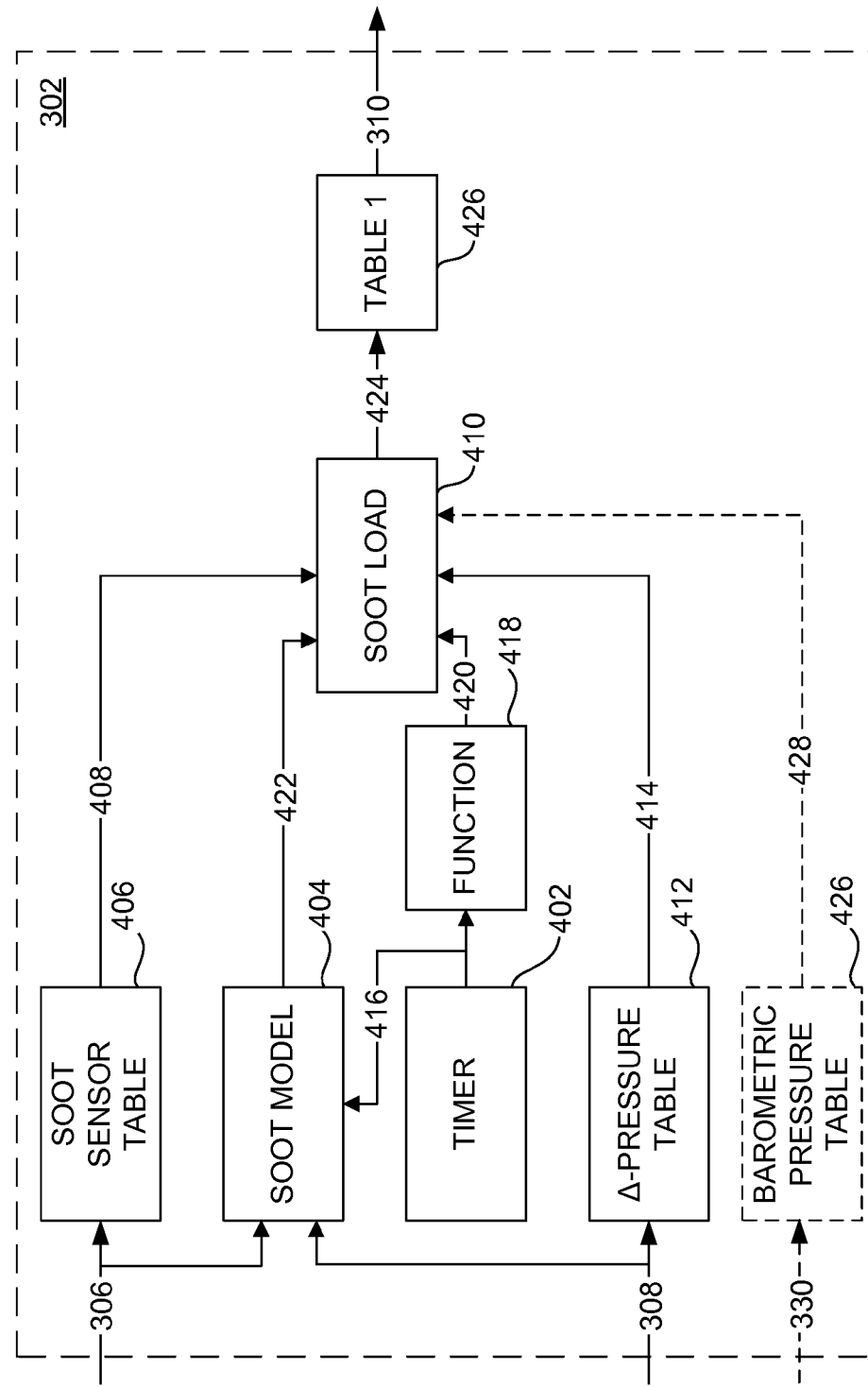
FIG. 4 is a block diagram of a process for determining a soot level in a DPF in accordance with the disclosure.

One embodiment of the DPF soot loading determinator 302 is shown in the block diagram of FIG. 4. In this embodiment, an implementation using multiple methods of determining the soot loading of the DPF are operated in concert, but one can appreciate that any one of these, or other, equivalent methods, may be used. In the illustrated embodiment, the DPF soot loading determinator 302 employs four different methods of estimating the soot loading of a DPF filter, which methods include an estimation based on the soot signal 306, the pressure signal 308, a timer 402, and a soot accumulation model 404.

Beginning with the determination based on the soot signal 306, such signal is provided to a transfer function, which is illustrated as a soot sensor table 406. Information about the soot loading state of the DPF is provided by the soot signal 306 in the form of, for example, a voltage, which is then correlated to value representing the actual soot loading of the filter. The values populating the table 406 may be predetermined as a result of a calibration of the sensor providing the soot signal 306, and can be provided as a sensor-based soot signal 408 to a soot load selector 410.

In a similar fashion, the pressure signal 308 can be provided to a pressure difference table 412, which provides a pressure-based soot signal 414 to the soot load selector 410. The pressure difference table 412 may be calibrated to correlate values of pressure difference across the DPF to estimations of the corresponding soot loading of the DPF. In the case where a pressure value is used instead of a pressure difference across the DPF, the pressure table 412 may be calibrated accordingly.

In a third method of calculating soot loading on a DPF, the soot signal 306 and/or the pressure signal 308 may be provided to the soot accumulation model or function 404. In one embodiment, both the soot signal 306 and pressure signal 308 are provided to the soot accumulation model 404, but in alternate embodiments that include model-based soot accumulation calculators fewer, different, or no such signals may be provided. In the illustrated embodiment, a time signal 416 generated by the timer 402 is also provided to the soot accumulation model 404. The time signal 416 may simply be indicative of the operating time of the engine since a previous or last regeneration event, or may alternatively be indicative of another operating parameter of the engine since the last regeneration event. Such other operating parameters of the engine may include total hours of operation, total amount of fuel used, total amount of power generated, and others, all calculated since a last regeneration event of the engine. One can appreciate that any parameter of the operation of the engine that is correlated to the amount of carbon produced by the engine may be tracked and its effect on carbon deposition quantified during intervals between regeneration of the DPF.

The time signal 416 is also provided to a time function 418 in one embodiment. The time function 418 may be a control device that correlates an estimated time-based soot signal 420 with, in this case, the time signal 416. As in the other modes, the time-based soot signal 420 is provided to the soot load selector 410.

In the illustrated embodiment, the soot accumulation model 404 may be an analytical or empirical function or model that estimates the soot accumulation on a DPF based on operating parameters of an engine, in this case, a signal from a soot accumulation sensor, an indication of a pressure across the DPF, and a time since the last regeneration was performed. The output of the soot accumulation function 404 is a model-based soot signal 422 that is provided to the soot load selector 410.

The soot load selector 410 provides an estimated soot loading 424 to a table 426, such as Table 1. The estimated soot loading 424 may be determined based on one or more of the various signals provided to the soot load selector 410. In one embodiment, the soot load selector 410 may simply select the highest estimated value of soot loading among the signals provided, namely, the sensor-based soot signal 408, the model-based soot signal 422, the time-based soot signal 420, and the pressure-based soot signal 414. In such embodiment, selection of the highest estimation for soot loading ensures that the estimation of the soot loading will be conservative.

In an alternate embodiment, the soot load selector 410 may determine the best estimation of soot loading based on the signals provided. More specifically, the soot load selector 410 may monitor the soot signals provided to ensure that any estimation is both accurate and consistent with the efficient operation of the engine. The soot load selector 410 further may consider the sensor-based soot signal 408 as the base for estimating the soot accumulation of the filter. The soot accumulation thus estimated may be compared with the model-based soot signal 422 to ensure that it is consistent or within an acceptable range, for example, a range of ±10%. This comparison may be performed as a check of the values provided by the sensor providing the soot signal.

An additional check of the sensor-based soot signal 408 may be made by comparing the time-based soot signal 420 and/or the pressure-based soot signal 414 with the sensor-based soot signal 408. As before, such comparison may be used to discover potential issues with the accuracy of the soot signal 306 when the result of the comparison indicates a discrepancy between the compared values of more than a threshold value, for example, a discrepancy of about 10% or more.

The estimated soot loading 424 is provided to the table 426, which yields the normalized soot level or soot loading determination signal 310 (FIG. 3). In one embodiment, the estimated soot loading 424 is expressed in terms of percentage of the soot loading capacity of the DPF. The soot loading determination signal, 310 is determined based on a lookup table, for example, Table 1 described above.

Returning now to FIG. 3, the after-treatment control 300 further includes the regeneration readiness determinator 304, which provides a readiness level signal 312 based on one or more signals that are indicative of the state or work mode of the machine of vehicle. The regeneration readiness determinator 304 examines the functional state of various machine components or systems for indications of ongoing or imminent changes in operational status. The regeneration readiness determinator 304 provides an indication, in the form of the readiness level signal 312, of the state of machine operation. Such readiness level signal 312 can provide multiple levels of the work status of the machine ranging from the machine being completely idle or not in a work mode to the machine being fully engaged at work. Such information may be used to determine when a regeneration event may be initiated.

As can be appreciated, a non-work mode of the machine is the desired time to initiate regeneration because a regeneration event may be intrusive to the machine's operation when the machine is in work mode. However, initiation of a regeneration may be conducted at other times should it become necessary due to high soot loading of the DPF. In other words, the importance of initiating a regeneration event may increase based on soot loading of the DPF and is balanced against the relative undesirability of initiating regeneration when the machine is working. In the embodiment presented, certain machine operating parameters are presented as inputs provided to the regeneration readiness determination, but one can appreciate that any other suitable parameters may be used. Further, different machines or vehicles may include components and systems onboard that are better suited to provide an indication of the work mode of the machine or vehicle, and in such instances, the regeneration readiness determination may be tailored to make use of such specialized parameters. The embodiment described below refers to parameters that may be available on a work machine and should not be construed as exclusive of other parameters that may be used in addition to or instead of the parameters presented.

The regeneration readiness determinator 304 in the embodiment illustrated is provided with a park brake signal 314, a neutral transmission signal 316, an implement status signal 318, a throttle control signal 320, a throttle signal 322, a vehicle speed signal 324, and potentially others, such as a signal indicating that an operator is present. Such signals are processed within the regeneration readiness determinator 304 to provide the readiness level signal 312. In one embodiment, the readiness level 312 is an integer value between 0 and 8, with 0 indicating that the machine is in full work mode and 8 indicating that the machine is not in work mode. Readiness levels between 1 and 7 indicate various intermediate states of work mode.

Figure 5:
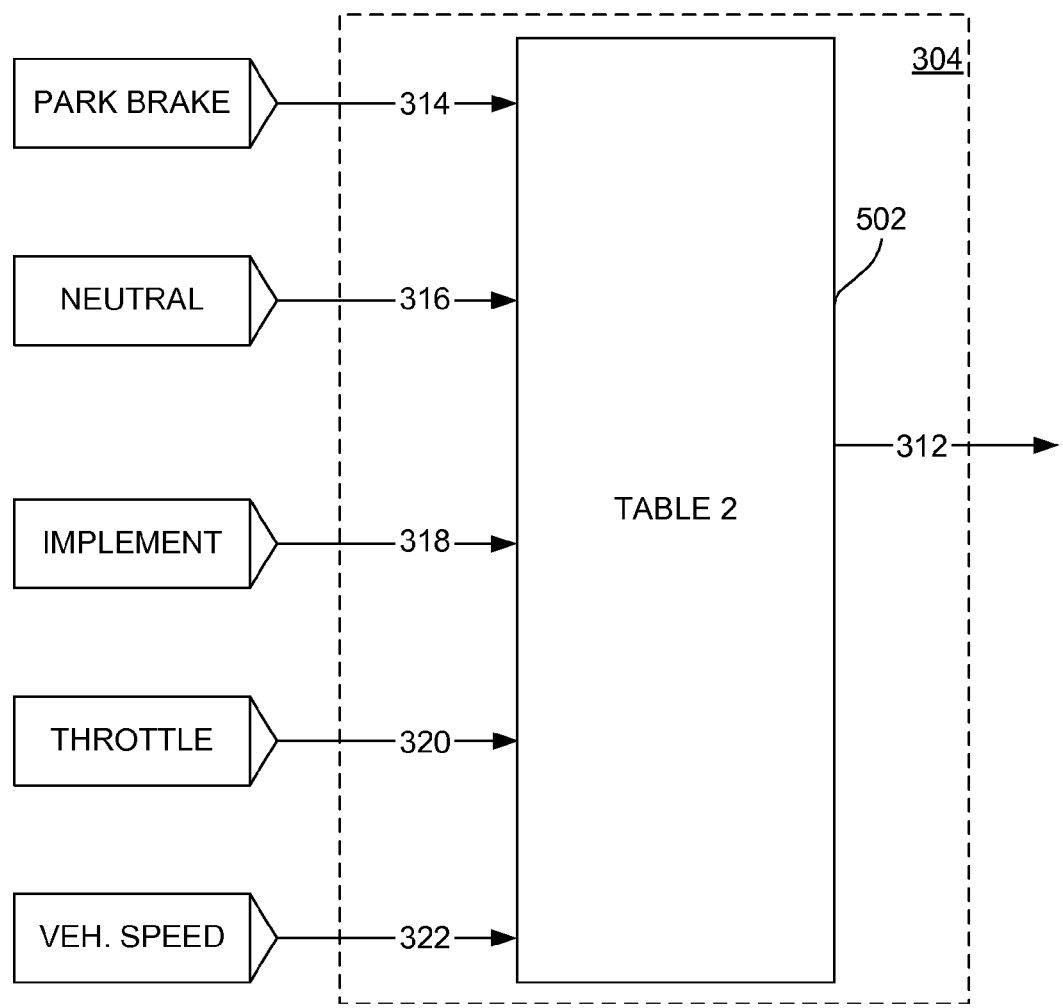
FIG. 5 is a block diagram of a process for determining an application readiness level for regeneration of a DPF in accordance with the disclosure.

A block diagram of one embodiment for the regeneration readiness determinator 304 is shown in FIG. 5. In this embodiment, the various machine operating parameters are provided to a table function 502 and used to determine the operating state of the machine. For example, the park brake signal 314 may be a simple ON/OFF indication of whether the parking or emergency brake of the machine has been set by the operator. Setting of the parking brake can be an indication of whether the machine is in work mode or not. The neutral transmission signal 316 is indicative of the gear selection in a transmission of a machine. The neutral transmission signal 316 may be a simple ON/OFF signal indicative of whether the transmission of a machine is in gear, which is an indication that the machine may be moving or preparing to move, or whether the transmission is in neutral. The implement status signal 318 may be a signal indicative of an activated implement status, or alternatively an interlock status of an implement control. The throttle control signal 320 may be an indication of whether a preset speed has been selected for the machine. The throttle signal 322 may be indicative of the extent of throttle activation of the machine, and the vehicle speed signal 324 may be indicative of the ground speed of the machine. One can appreciate that such signals may provide information as to the operating mode of the machine, but other parameters may be used, such as signals from an operator presence switch or sensor, a steering sensor, and so forth.

Such and other signals may be provided to a table, for example, Table 2 presented below, for categorization of the relative readiness level of the machine for regeneration of a machine based on the estimated work mode of the machine:

TABLE 2

| Readiness Level | Criteria |
| --- | --- |
| — | No Regeneration Required |
| 8 | Not in Work Mode |
| 7 | (Park ON) and (Neutral) and (Implement Status OFF) |

TABLE 2-continued

| Readiness Level | Criteria |
|---|---|
|   | and (Traction Sys. Control OFF) |
| 6 | (Park Brake ON) and (Neutral) and (Implement Status OFF) |
| 5 | (Park Brake OFF) and (Neutral), all other systems OFF |
| 4 | (Neutral) and (Implement Status OFF) |
| 3 | (Neutral) and (Traction Sys. Control OFF or SLOW) |
| 2 | (Implement Status OFF) and (Vehicle Speed = 0) |
| 1 | (No Throttle Command) and (Vehicle Speed = 0) |
| 0 | Regeneration disabled, Replace DPF |

As can be seen from Table 2, the various parameters provided to the regeneration readiness determinator 304 are evaluated and such information is categorized to determine the relative state of work mode. Such categorization is tabulated against a range of readiness levels, which represent the relative level of work the machine is in at any time.

Returning to FIG. 3, the soot level 310 and the readiness level 312 are provided to a regeneration control 326. The regeneration control 326 is arranged to schedule the initiation of a regeneration event based on the soot level 310 and the readiness level 312. Moreover, the regeneration control 326 may, at times, command a controller in the machine to reduce the power output of the engine, especially when the DPF has become overloaded. The regeneration control 326 operates, for example, to initiate a regeneration event whenever the machine is not in a work mode and the soot loading of the DPF is at least 50%. Such initiation of regeneration is performed on a regular basis to maintain a relatively low soot accumulation in the DPF. In certain machine applications, however, favorable non-working conditions of the machine may not occur often. In such situations, a regeneration event may be delayed and may be performed under less than favorable conditions or at conditions beneath a threshold readiness level. Under some circumstances, operation of the engine may be adjusted, for example, to increase the flow of exhaust gas through the DPF during regeneration, or to reduce the power rating of the engine when the extent of soot loading of the DPF exceeds 100%.

In one embodiment, the regeneration control 326 operates to schedule the initiation of a regeneration event when a predetermined soot level 310 coincides with a predetermined readiness level 312 that has been selected as suitable for regeneration. Such relationship between the soot level 310, the readiness level 312, and an indication of whether engine control or engine power reduction is required is presented in Table 3 below:

TABLE 3

| | Soot Level (%) | | | | |
|---|---|---|---|---|---|
| | 5 (140%) | 3.5 (110%) to 4 (120%) | 3 (100%) | 2 (80%) | 1 (50%) |
| Readiness Level | | | | | |
| | 0 | 1    2 | 3    4 | 5    6 | 7    8 |
| Engine Control Allowed | NO | NO    NO | YES    YES | YES    YES | YES    YES |
| Engine De-rate | — | 20% to 100% | 20%    NO | NO    NO | NO    NO |

As can be seen from this exemplary table, no engine control is allowed when the soot accumulation in the DPF exceeds the capacity of the filter. Moreover, regeneration initiation is enabled for soot accumulations exceeding 50% of the capacity of the DPF, and is disabled when the soot level exceeds a threshold, e.g., soot Level 4. At other times during operation, the regeneration control 326 may first determine the readiness level of the machine, and based on the readiness level, determine a suitable time to initiate a regeneration event based on the soot level in accordance with the schedule presented in Table 3. When the regeneration control determines that a regeneration event should be initiated, an appropriate regeneration command 328 is provided at the output of the aftertreatment control 300.

INDUSTRIAL APPLICABILITY

Figure 6:
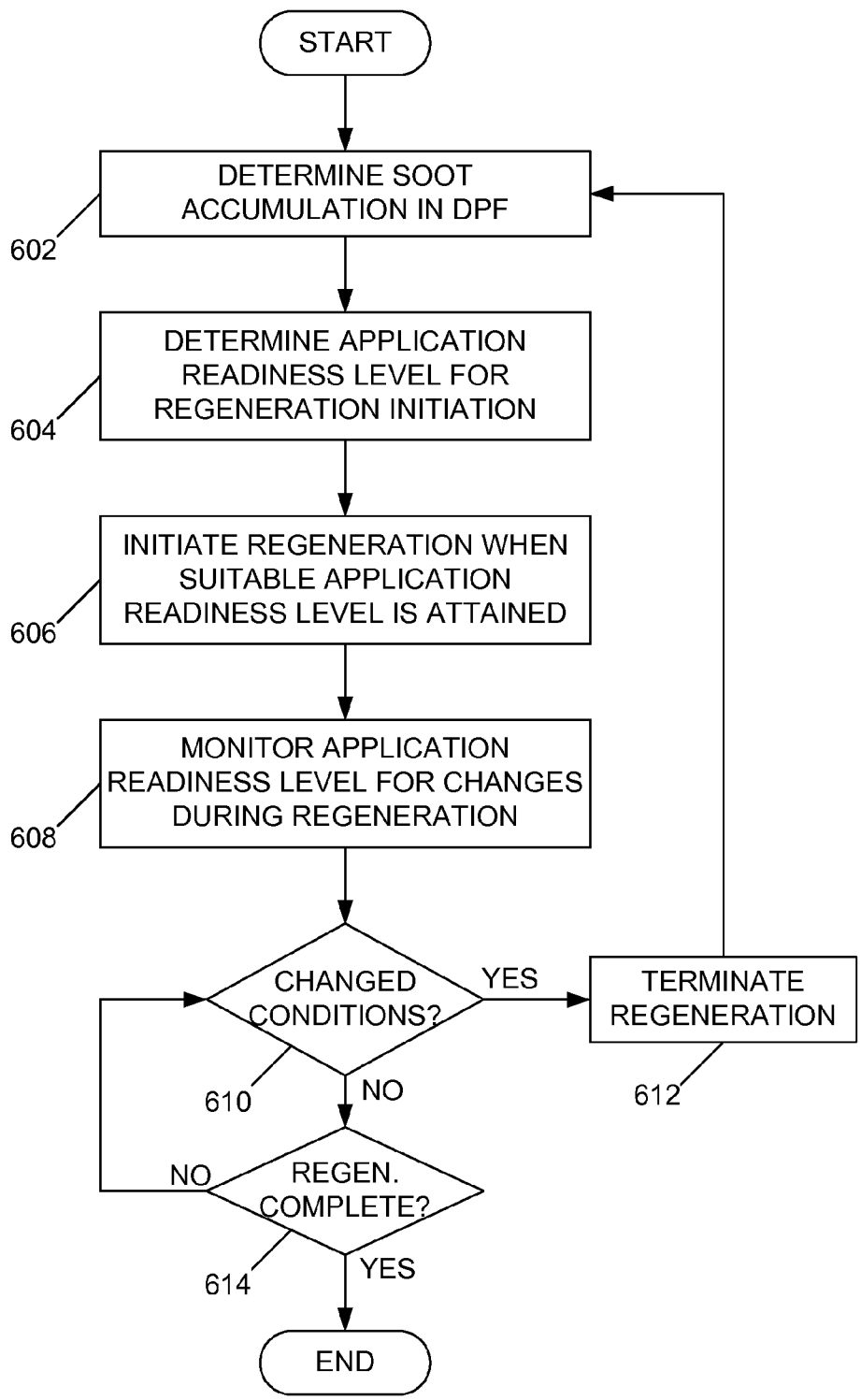
FIG. 6 is a flowchart of a method for determining when to initiate a regeneration event for a DPF in accordance with the disclosure.

An exemplary control strategy is illustrated in the flowchart of FIG. 6. The flowchart illustrates one embodiment of a control strategy for initiating a regeneration event for a DPF in accordance with the disclosure. Such control strategy may be implemented in the form of computer executable instructions that reside in a computer readable or accessible medium that is integrated with a logic device in a machine, such as an electronic controller. In the exemplary embodiment, the control strategy includes a determination of the soot loading of the DPF at 602. Such determination may include receipt of sensor signals that are indicative of the soot loading on the DPF and/or an estimation of such loading based on various operating parameters of an engine.

The control strategy further includes a determination of the application readiness level for initiation of regeneration at 604. As described above, the application readiness level is, in one embodiment, a determination or estimation of the degree to which the machine or vehicle is determined as being in a work mode or in a non-working mode. Initiation of a regeneration event is favored under conditions when it has been determined that machine or vehicle is not working, but a regeneration may be initiated at other times depending on the extent of soot accumulation in the DPF even though such action may adversely affect the performance of the operation of the machine. The determination of the work mode of the machine may be based on monitoring any appropriate operating parameter of the machine or vehicle for indications of use. For example, such operating parameters may involve operator switches, idle timers, emergency or park brake sensors, occupant switches, implement status, vehicle speed, engine speed, and/or other parameters.

In certain applications, especially those involving regular machine work schedules, the control strategy may be arranged to include a programmable regeneration initiation feature. Such feature may, for example, include a schedule for initiating regeneration at times selected by the user, which would be especially useful for machine applications that involve a substantially constant mode of the machine that otherwise may not have provided an appropriate time to regenerate. In an alternate embodiment, such feature may further include functionality that can discern a regular jobsite schedule and adaptively determine when machine downtime is forthcoming. Such information may be used to defer or schedule regeneration during jobsite downtime periods such that intrusion on the normal operation of the machine may be minimized. In certain applications including fleets of machines operating collectively in a single site and according to similar schedules, information indicative of the soot accumulation of each machine may be transmitted to a central information processing station. Such central station may be located at the jobsite, or may alternatively be part of a larger network of stations that are monitored by a local equipment servicing entity or an equipment manufacturer. Such collecting monitoring of fleet operations can enable a scheduling or staggering of regeneration of machines belonging to a work group such that overlapping downtimes of the machines can be minimized or avoided. Hence, the central information processing station may be capable of sending regeneration commands to each of the machines it monitors.

Having determined or estimated the soot accumulation in the DPF at 602, the control strategy may monitor the application readiness level for an opportune time to initiate regeneration at 606. Such initiation may occur based on a predetermined function or schedule that becomes more aggressive in initiating regeneration as the soot accumulation increases. During initiation, the control strategy may monitor the regeneration readiness level of the machine while the regeneration is underway at 608. In the event that an operator command or a change in a machine operating parameter alters the previously determined readiness level during regeneration, a decision may be made at 610 to interrupt the regeneration at 612. In other instances, the regeneration may be completed at 614 and the process repeated.

In one general aspect, the regeneration control described herein may include additional functionality for use during regeneration of the DPF. As described in the '822 patent, the contents of which are incorporated herein by reference, a regeneration device may operate to create a flame that initiates and/or maintains the combustion of soot accumulated on the DPF during regeneration. In one embodiment of the present disclosure, as shown in FIG. 2, a valve 246 may be disposed to modulate the flow of fresh air supplied to the regeneration device 210 via the conduit 214. The valve 246 may be a proportional air control valve that is responsive to air flow commands from the controller 222 or another controller (not shown) operating to modulate the flow of air provided to the regeneration device 210 during a regeneration event. Such event that may be initiated under engine operating conditions that may not provide an optimal airflow required by the regeneration device 210 for proper operation. One may appreciate that, in accordance with the foregoing discussion, less than optimal circumstances may occur when the soot level of the DPF is relatively high and regeneration is initiated under machine or engine work conditions that are less desirable.

Even though the valve 246 may be useful in certain applications, its use is optional and may further increase the cost and complexity of a machine or vehicle system. For this reason, the function of controlling the flow of air provided to the regeneration device 210 may be substituted, when the valve 246 is not present, or is present but not used, by appropriately controlling the operation of the engine 204. More specifically, the controller 222 or another controller (not shown) may receive information indicative of pressure in the intake manifold 218 of the engine 204 via a boost sensor 248, information about the pressure in the exhaust manifold 216 via a backpressure sensor 250, information about the airflow into the engine 204 via a mass airflow (MAF) sensor 252, and/or information about the ambient pressure in the operating environment of the machine as an indication of operating altitude via a barometric pressure (BP) sensor 254.

The controller 222 may use such information to adjust the speed of the engine 204 and the intake manifold or boost pressure to achieve a desired flow of air through the conduit 214. Such desired flow of air through the conduit 214 may be arranged to suffice for operation of the regeneration device 210 without additional control, i.e., without control by the valve 246. Such airflow through the conduit 214 may be especially relevant when the regeneration device 210 is attempting to initiate a regeneration event. Engine control under such conditions may include an adjustment of engine speed and/or engine torque output performed in a known fashion to achieve a desired airflow through the conduit 214. One can appreciate that a desired airflow through the conduit 214 may be a function of more than one parameter, which can include boost pressure, backpressure, engine speed, engine load, and others.

In one embodiment, an estimation of the airflow through the conduit 214, especially in the absence of any effects from the valve 246, and through the engine 204 in general, may be refined by limiting the operating window of the engine during regeneration. As is known, one method of initiating and/or controlling a regeneration event is to transition between lean and rich engine combustion. Such transitions may adjust the content of combustible compounds in the exhaust gas of the engine, which can affect the rate of regeneration. In the past, engines were operated using a rich combustion mixture during most of the regeneration event. Use of the regeneration device, however, permits operation of the engine with a lean combustion mixture because the regeneration event may be controlled by use of the regeneration device.

One parameter requiring adjustment during operation of the regeneration device 210 is the flow of air through the conduit 214, which may depend on, or may be calculated based on, the intake airflow of the engine as measured by the MAF sensor 252. As such, the accuracy of the MAF sensor 252 may be relevant to the operation of the regeneration device 210. In one embodiment, the MAF sensor 252 may be selected to provide improved accuracy over a relatively narrow portion of its operating range. The controller 222 may provide a narrow range of operation of the engine having an engine intake air flow that falls within the narrow portion of the operating range of the MAF sensor 252 such that improved accuracy in the air flow measurement of the MAF sensor 252 may be achieved when the regeneration device 210 is active.

Figure 7:
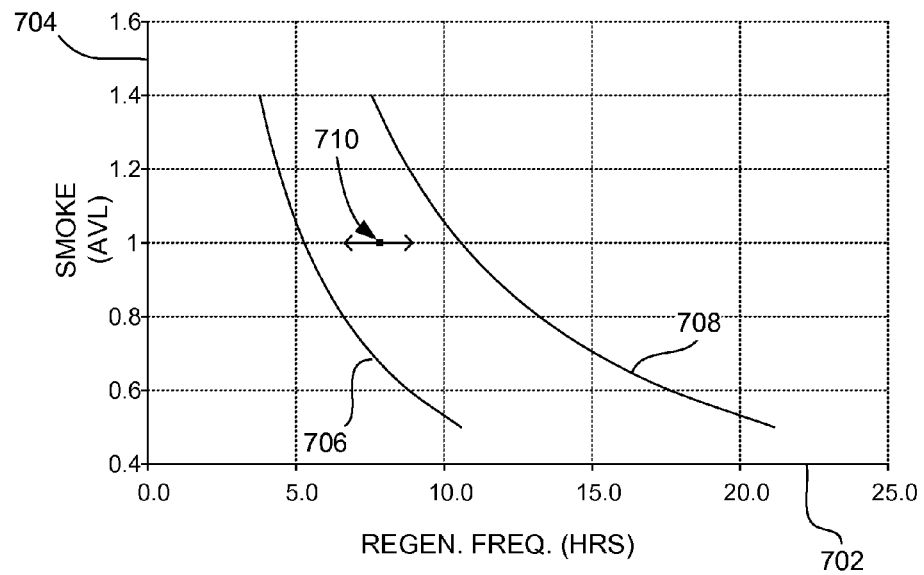
FIG. 7 is a graph showing an exemplary collection of data in accordance with the disclosure.

In general, the soot loading estimation can be adjusted to avoid prolonged regeneration events and increased thermal stresses in the DPF. One exemplary collection of data relevant to regeneration frequency is shown in the graph of FIG. 7. The graph illustrates one correlation between regeneration frequency, soot loading of the DPF, and operating conditions of the engine. Specifically, the graph has regeneration frequency in hours plotted against the horizontal axis 702. A smoke number, such as those acquired by testing equipment manufactured by AVL Emission Test Systems, of Germany, that is indicative of particulate concentration in the exhaust gas of the engine is plotted against the vertical axis 704 such that the smoke number increases as the density of particulates in the exhaust gas increases.

The graph shown in FIG. 7 includes a first curve 706 and a second curve 708. The first and second curves 706 and 708 represent two concentrations of soot loading on a DPF and the relationship between time intervals for regeneration and smoke density yielding such regeneration. In the graph shown, the first curve 706 represents a soot concentration of about 3.5 grams of soot per liter of filter material (g/L), and the second curve 708 represents a soot concentration of about 7 g/L. An operating point 710 of the engine is plotted for illustration.

As can be seen from the graph, an after-treatment control arranged to initiate regeneration at a soot level of about 3.5 g/L, with the engine operating at a smoke level of about 1, may do so at an intervals of about 5 hours. The same after-treatment control arranged to initiate regeneration at a soot level of 7 g/L at the same engine smoke level may cause regeneration to occur at intervals of about 10 hours. One can appreciate that as the interval between regenerations increase, the total amount of soot accumulated on the filter also increases, which in turn increases the time required for completion of regeneration and also increases the temperature of the DPF during regeneration as the increased combustible soot material prolongs the duration and intensity of soot combustion. Such factors may influence the level of thermal stress within the DPF as the altitude of operation of the machine changes.

Figure 8:
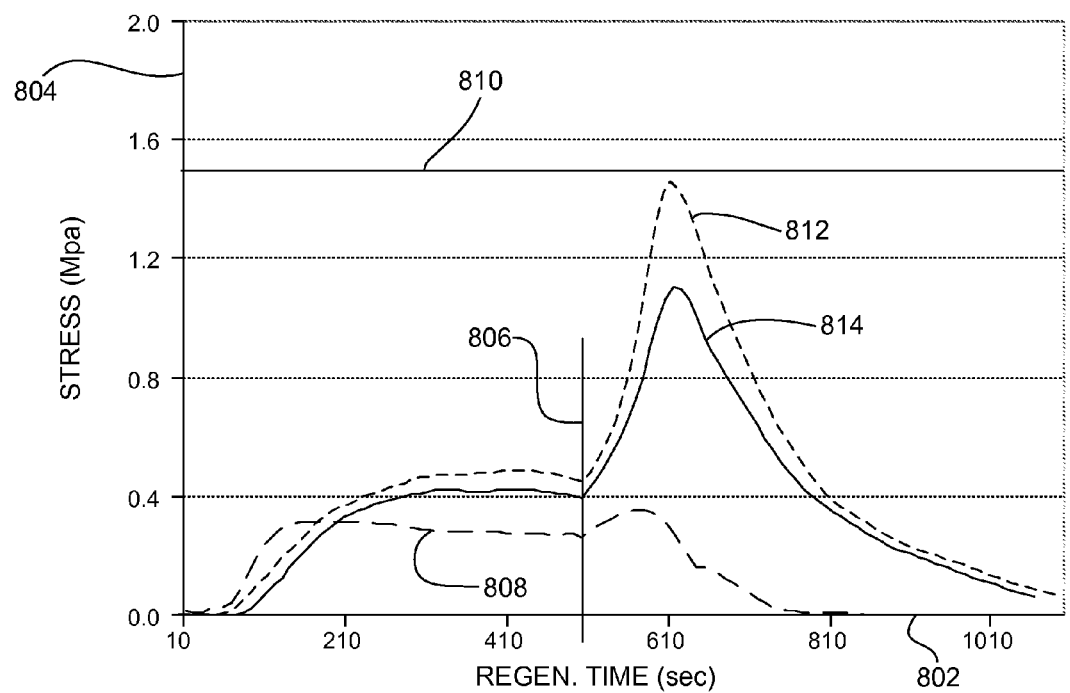
FIG. 8 is a time trace of estimated stress in accordance with the disclosure.

A graph illustrating the effects of soot accumulation and altitude on thermal stresses within the DPF during regeneration, for a particular DPF arrangement operating under the same set of engine operating conditions, is shown in the graph of FIG. 8 for illustration of the principle of operation of the altitude compensation in the after-treatment control 300 (FIG. 3). The graph shown in FIG. 8 is a time trace of estimated or measured stress in the DPF during a regeneration event. The graph plots time, expressed in seconds (sec.), along the horizontal axis 802 and corresponding stress in the DPF, expressed in Mega Pascal (MPa), along the vertical axis 804. Such graph may be created by the real-time measurement of stress within the DPF or, alternatively, by real-time measurement of DPF temperature and subsequent correlation of temperature to thermal stress in the DPF.

The graph includes three stress trace curves representing the stress within the DPF under different soot concentration and altitude conditions of operation, which have been time-aligned to better illustrate the differences observed between the three individual tests conducted. In each test, the regeneration was initiated with the engine running at a specific engine speed, which engine speed was reduced to an idle speed 500 sec. after the regeneration had begun. The 500 sec. time point at which the engine speed was reduced is indicated by the vertical line 806 in the graph. Such reduction in engine speed was performed to illustrate the effects of reduced engine exhaust flow at idle on the thermal stress of the DPF during regeneration. As can be seen from the graph, the thermal stresses in all three stress curves increase following the reduction of engine speed.

More particularly, a first stress trace curve 808 represents the time evolution of stresses within the DPF during regeneration initiated with the machine operating at sea level and with the DPF including a soot load concentration of about 7.5 g/L. As can be seen from the graph, the regeneration represented by the first stress trace curve 808 increases the stress in the DPF shortly after combustion of soot begins, and remains relatively steady thereafter while the engine operates at an elevated speed during the first 500 seconds. The reduction in engine speed at 500 seconds causes the stress to increase by about 35% while remaining well below a stress limit of about 1.48 MPa, which is represented by the horizontal line 810 on the graph.

A second stress trace curve 812 represents the same operating condition of the machine as the first stress trace curve 812 with the exception that the machine is operating at an altitude of about 10,000 feet (3.05 km). As can be seen from the graph, operation at this altitude yields an increase of stress in the DPF by a factor of about 1.8 while the engine is operating at the higher engine speed within the first 500 seconds of the test. Such increase may be due to the elevated temperature of exhaust gas provided by the engine at the high altitude. As can also be seen from the graph, the stress in the DPF dramatically increases by over 220% compared to the stress before the engine speed was reduced following the reduction in engine speed. The peak stress in the second stress trace curve 812 is still below but approaches the stress limit 810. The degree of increase in stress both before and after a change in engine speed between the first and second stress trace curves 808 and 812 illustrates the effect of altitude.

A third stress trace curve 814 illustrates the effect of soot accumulation on stress in the DPF during regeneration. More specifically, the third stress trace curve 814 represents an operating condition that is the same as the operating condition used for generating the second stress trace curve 812, i.e. operation at high altitude, but the soot accumulation at the initiation of regeneration was about 6 g/L. As can be seen from the graph, the stresses in the DPF begin rising later than in the other two illustrated conditions, are about 10% lower than the stresses represented by the second stress trace curve 812 during the initial 500 seconds before the reduction in engine speed, and the stress spike following the reduction in engine speed is about 25% lower than the spike illustrated by the second stress trace curve 812. The degree of decrease in the stresses between the second and third stress trace curves 812 and 814 illustrates the effect of soot accumulation.

As can be understood, the exemplary conditions presented illustrate that stress due to thermal effects in the DPF during regeneration may dramatically increase when the altitude of operation of the engine increases, but it can also decrease for regeneration conducted at a lower total soot accumulation in the DPF. Returning now to FIG. 3, an estimation of the altitude of operation of the machine may be used to adjust the estimation of soot accumulation in the DPF, and particularly, to set a soot accumulation limit for the DPF. Such limit may simply be used to initiate regeneration or may alternatively be used as the soot accumulation capacity of the DPF for calculating the soot level as discussed above and as shown in Table 1. Operation of internal combustion engines at altitudes above seal level may tend to increase exhaust temperatures due to the lower density of air at the high altitude and the lower concentration of oxygen available for combustion. Such increase in exhaust temperature may alter the rate of cooling of the DPF during regeneration due to the flow of exhaust gas passing therethrough, and may increase the core temperature of the DPF. One can appreciate that thermal stresses in the DPF should be considered when selecting a particular size and configuration of the DPF for a specific application.

To address such and other issues, one embodiment of the after-treatment control 300 shown in FIG. 3 includes an optional, additional input 330 that is indicative of the barometric pressure of operation of the machine, such as a signal from the BP sensor 254 shown in FIG. 2. The barometric pressure 330 is shown in dotted line to indicate that such input is optional for the illustrated embodiment of the after-treatment control 300 shown in FIG. 3. In accordance with this alternate embodiment, the barometric pressure 330 is input to a barometric pressure compensation table 426. In one embodiment, the barometric compensation table 426 may include tabulated values correlating barometric pressure values, which are indicative of operating altitude, with desired or appropriate compensation values for the soot limit or soot capacity permitted for the DPF. An output of the barometric pressure table 426 may be provided in the form of an altitude-based soot compensation 428 that is provided to the soot load selector 410. As an additional functionality of the soot load selector 410, the soot load selector 410 may adjust or compensate the estimated soot loading 424 by the altitude-based soot compensation 428. In one embodiment, such adjustment can decrease the soot limit by an amount that will increase the estimated soot loading percentage or soot level of the DPF, such that a regeneration is initiated at an earlier time when the machine is operating at a high altitude. Even though one embodiment is presented for adjusting the estimated soot loading herein, other methods may be used.

It will be appreciated that the foregoing description provides examples of the disclosed system and technique for regeneration of a diesel particulate filter. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. Moreover, all methods described herein can be performed in any suitable order unless otherwise indicated herein or otherwise clearly contradicted by context.

We claim:

1. A machine having an exhaust-treatment system that includes a diesel particulate filter (DPF) requiring periodic regeneration, the DPF disposed to receive a flow of exhaust gas provided by an engine associated with the machine, the machine comprising:
a sensor providing a signal indicative of a soot accumulation in the DPF;
at least one device providing an operating parameter indicative of a work mode of the machine;
a controller associated with the machine and disposed to receive the signal from the sensor and the operating parameter from the at least one device, the controller being further disposed to:
determine a soot level based at least partially on the signal;
determine a readiness level based at least partially on the operating parameter;
classify the soot level into a plurality of soot level categories relative to a plurality of different desired ranges for initiating a regeneration event;
classify the readiness level into a plurality of readiness level categories relative to different work-modes of the machine for initiating the regeneration event;
correlate the soot level categories with the readiness level categories such that each soot level category corresponds to a particular readiness level category for initiating the regeneration event; and
initiate the regeneration event when the particular readiness level category that corresponds to the soot level has been achieved.

2. The machine of claim 1, further including a regeneration device disposed between the engine and the DPF along an exhaust conduit interconnecting the engine with the DPF, wherein the controller is further disposed to activate the regeneration device.

3. The machine of claim 1, wherein the DPF is disposed along an exhaust conduit fluidly connecting the engine with the DPF, and wherein the sensor is at least one of an upstream pressure sensor disposed between the engine and the DPF along the exhaust conduit, a downstream pressure sensor disposed between the DPF and an outlet of the exhaust conduit, a differential pressure sensor disposed to measure a pressure difference across the DPF, and a soot accumulation sensor integrated with the DPF and disposed to measure an amount of soot accumulated in the DPF.

4. The machine of claim 1, wherein the at least one device is at least one of a brake sensor, a transmission sensor, a presence sensor, an implement status sensor, a throttle sensor, and a vehicle speed sensor of the machine, and wherein the controller comprises at least one programmable processing unit.

5. The machine of claim 1, wherein the soot level is determined based on a percentage of the soot accumulation in the DPF relative to a soot accumulation capacity of the DPF.

6. The machine of claim 1, wherein the controller is disposed to determine the soot level by at least one of interpolating the soot level from a soot sensor table based on the signal, calculating the soot level using a soot accumulation model, and estimating the soot level based on a timer signal.

7. A method for initiating a regeneration event for a diesel particulate filter (DPF) associated with a machine and disposed to receive a flow of exhaust gas from an engine of the machine, the method comprising:
providing a signal indicative of a soot accumulation in the DPF;
providing an operating parameter indicative of a work mode of the machine;
determining a soot level based at least partially on the signal;
determining a readiness level based at least partially on the operating parameter;
classifying the soot level into a plurality of soot level categories relative to a plurality of different desired ranges for initiating the regeneration event;
classifying the readiness level into a plurality of readiness level categories relative to different work-modes of the machine for initiating a regeneration event;
correlating the soot level categories with the readiness level categories such that each soot level category corresponds to a particular readiness level category for initiating the regeneration event; and
initiating the regeneration event when the particular readiness level category that corresponds to the soot level is determined to be present.

8. The method of claim 7, wherein initiating the regeneration event includes activating a regeneration device.

9. The method of claim 7, wherein the DPF is disposed along an exhaust conduit fluidly connecting the engine with the DPF, and wherein the signal is provided by at least one of an upstream pressure sensor disposed between the engine and the DPF along the exhaust conduit, a downstream pressure sensor disposed between the DPF and an outlet of the exhaust conduit, a differential pressure sensor disposed to measure a pressure difference across the DPF, and a soot accumulation sensor integrated with the DPF and disposed to measure an amount of soot accumulated in the DPF.

10. The method of claim 7, wherein the operating parameter is at least one of a brake sensor signal, a transmission sensor signal, a presence sensor signal, a throttle sensor signal, and a vehicle speed sensor signal.

11. The method of claim 7, wherein the soot level is determined based on a percentage of the soot accumulation in the DPF relative to a soot accumulation capacity of the DPF.

12. The method of claim 7, further including increasing a frequency of the regeneration event based on a barometric pressure signal provided by a barometric pressure sensor disposed to measure a barometric pressure that is indicative of an altitude of operation of the machine.

13. An after-treatment system associated with an engine of a machine, the after-treatment system comprising:
an after-treatment device disposed in fluid communication with an exhaust conduit that is connected to the engine;
a regeneration device disposed along the exhaust conduit between the engine and the after-treatment device;

a first sensor associated with the after-treatment device and disposed to provide a soot signal indicative of a soot accumulation in the after-treatment device;

a second sensor associated with the machine and disposed to provide a work signal indicative of a work mode of the machine;

a controller associated with the engine, the regeneration device, the first sensor, and the second sensor, the controller comprising at least one programmable processing unit and disposed to:

determine a soot level of accumulation within the after-treatment device based on the soot signal;

determine a readiness level of regeneration for the after-treatment device based on the work mode of the machine, the work mode being at least partially based on the work signal;

classify the soot level into a plurality of soot level categories relative to a plurality of different soot level ranges;

classify the readiness level into a plurality of readiness level categories relative to different work-modes of the machine for initiating a regeneration event;

correlate the soot level categories with the readiness level categories such that each soot level category corresponds to a particular readiness level category for initiating the regeneration event; and command the regeneration device to initiate the regeneration event in the after-treatment device when the particular readiness level category that corresponds to the soot level based on the correlation between the soot level categories and the readiness level categories is present.

14. The after-treatment system of claim 13, wherein the regeneration device includes a flame sensor and a fuel injector, and wherein the regeneration device operates to initiate and maintain the regeneration event in a diesel particulate filter that is included in the after-treatment device.

15. The after-treatment system of claim 13, wherein the first sensor is at least one of an upstream pressure sensor disposed between the engine and the after-treatment device, a downstream pressure sensor disposed between the after-treatment device and an outlet of the exhaust conduit, a differential pressure sensor disposed to measure a pressure difference across the after-treatment device, a barometric pressure sensor disposed to measure a barometric pressure that is indicative of an altitude of operation of the machine, and a soot accumulation sensor integrated with the after-treatment device and disposed to measure an amount of soot accumulated in a diesel particulate filter included within the after-treatment device.

16. The after-treatment system of claim 13, wherein the second sensor is at least one of a brake sensor, a transmission sensor, a presence sensor, a throttle sensor, and a vehicle speed sensor.

17. The after-treatment system of claim 13, wherein the soot level is determined based on a percentage of the soot accumulation in a diesel particulate filter that is included within the after-treatment device relative to a soot accumulation capacity of the diesel particulate filter.

18. The after-treatment system of claim 17, further including a barometric pressure sensor providing a barometric pressure signal indicative of an altitude of operation of the machine, wherein the controller is further disposed to receive the barometric pressure signal and calculate the soot accumulation capacity of the diesel particulate filter based on the altitude of operation of the machine.

19. The after-treatment system of claim 13, wherein the controller is disposed to determine the soot level by at least one of interpolating the soot level from a soot sensor table based on the soot signal, calculating the soot level using a soot accumulation model, and estimating the soot level based on a timer signal and wherein the timer signal includes information indicative of the elapsed time from a prior regeneration event.

20. The after-treatment system of claim 13, wherein the controller is further disposed to adjust at least one of a speed and a load of the engine during the regeneration event such that a flow of air is provided to the regeneration device in a predetermined rate via a conduit fluidly connecting the regeneration device with an intake manifold of the engine.

21. The after-treatment system of claim 19, further including a mass air flow (MAF) sensor providing a signal indicative of the flow of air provided to the regeneration device, wherein the MAF sensor is arranged to operate over a range of flows, wherein the MAF sensor has an improved accuracy over a narrow range of flows, and wherein the controller is further disposed to adjust the speed of the engine during the regeneration event such that the flow of air is within the narrow range of flows.

* * * * *